United States Patent
Wolcott et al.

(10) Patent No.: US 7,359,639 B2
(45) Date of Patent: Apr. 15, 2008

(54) AIRBORNE FREE SPACE OPTICAL COMMUNICATION APPARATUS AND METHOD WITH SUBCARRIER MULTIPLEXING

(75) Inventors: Theodore J. Wolcott, Palo Alto, CA (US); Johnny M. Harris, Centerville, UT (US); Richard B. Ertel, Sandy, UT (US)

(73) Assignee: L-3 Communications Corporation, New York, NY (US)

( * ) Notice: Subject to any disclaimer, the term of this patent is extended or adjusted under 35 U.S.C. 154(b) by 535 days.

(21) Appl. No.: 10/838,389

(22) Filed: May 4, 2004

(65) Prior Publication Data

US 2005/0249501 A1   Nov. 10, 2005

(51) Int. Cl.
*H04B 10/00* (2006.01)

(52) U.S. Cl. ............. 398/115; 398/124; 398/128; 398/130

(58) Field of Classification Search ........... 398/115, 398/116, 118, 121, 122, 124–126, 128, 130
See application file for complete search history.

(56) References Cited

U.S. PATENT DOCUMENTS

| 6,271,953 B1* | 8/2001 | Dishman et al. ............ 398/129 |
| 2002/0114038 A1* | 8/2002 | Arnon et al. ............... 359/145 |
| 2005/0117914 A1* | 6/2005 | Chuah et al. ............... 398/182 |

* cited by examiner

*Primary Examiner*—Dalzid Singh
(74) *Attorney, Agent, or Firm*—Perman & Green, LLP (57) ABSTRACT

A free space laser communication system uses subcarrier multiplexing to prepare multiple data communication channels for impressing onto a laser carrier. Sending and receiving terminals mutually track to insure acquisition of the transmitted data signals.

25 Claims, 9 Drawing Sheets

AIRBORNE FREE SPACE OPTICAL COMMUNICATION APPARATUS AND METHOD WITH SUBCARRIER MULTIPLEXING

BACKGROUND OF THE INVENTION

1. Field of the Invention

The present invention relates to high-speed communication between two aircraft, between an aircraft and a ground facility, or between an aircraft and a satellite. More particularly, the invention relates to the use of apparatus to employ subcarrier multiplexing techniques to modulate and demodulate an optical signal, transmitted between the two entities (transmitter and receiver) in free space.

2. Brief Description of Related Developments

Airborne communication systems currently employ radio-frequency (RF) transmission techniques to transmit information in free space. However, due to RF frequency band limitations (imposed by the U.S. and other governments), such systems are limited to data rates on the order of 1 Gbps.

Demands for higher transmission rates are increasing. Free-space optical (FSO) techniques, in which an optical signal (produced by a laser, for example) is used to carry the information, offer one method for higher rate transmission in the airborne environment.

FSO techniques have been developed for many applications, including terrestrial networks between buildings in metropolitan areas, and deep-space communication systems. Only recently have they been the focus of efforts for airborne applications. Typical FSO techniques employ simple on/off keying in which the data is conveyed by turning the light on and off. More sophisticated techniques, such as pulse-position modulation (PPM), in which the position of a short pulse within a designated time window is used to convey the information, are also under development.

Subcarrier Multiplexing (SCM) is a technique developed to minimize optical dispersion in fiber optic transmissions, whereby multiple channels of data are combined, using RF modulation techniques, and then impressed upon an optical carrier for transmission. An SCM receiver extracts the individual RF channels from the received optical carrier, and then uses RF demodulation techniques to recover the data. SCM has been employed in various applications, including Cable TV distribution (where it is the primary method for transporting the analog and digital TV channels through the optical network) and fiber-based optical communications networks.

The use of SCM techniques in the airborne FSO environment will provide a number of advantages over alternative methods, including: re-use of existing RF solutions in the airborne environment; channelization in the frequency domain, which in turn provides greater flexibility in system design; and scalability in terms of system complexity and cost.

SUMMARY OF THE INVENTION

The present invention is a communication terminal, consisting of hardware and software elements, made up of a transmitter and a receiver, which employs optical subcarrier multiplexing (SCM) techniques to transmit and receive data by way of an optical signal transmitted through a free-space channel. The communication terminal is capable of transmitting and receiving one or more independent channels of data on a single optical carrier (in each direction). Each data channel is carried as an individual subcarrier channel on the optical carrier. Two communication terminals, located on remote and local platforms, make up a communication system.

The present invention is intended for application in the airborne environment, to be mounted in an airborne platform for communication from one aircraft to another, from one aircraft to a ground facility, or one aircraft to a satellite.

The remote and local terminals are each capable of receiving independent data channels in two way communication from a designated data source, such as a data multiplexer, a sensor, a mass storage unit, or other device. Each of the independent data channels is processed by a Digital Signal Processor (DSP) (or similar device), which performs data scrambling, data interleaving, data compression, data encryption, forward error correction coding, or any combination of these and other DSP functions.

The local and remote terminals include terminal controllers which cause the transmission of an additional data channel, carrying command and control information from the local terminal controller to the remote terminal controller, that forms part of a set of data channels. This command and control channel may convey information from the communicating terminal controller, including receiver location, received signal performance metrics, and other operational information. This command and control channel may also carry voice and/or data traffic from the pilot or aircraft controller.

Each of the independent data channels (including the command and control channel) is modulated onto an intermediate-frequency (IF) carrier, for example, using standard M-ary Phase Shift Keying (MPSK), M-ary Quadrature Amplitude Keying (UVIQAM), or other modulation techniques.

The modulated IF signal is converted to a unique radio-frequency (RF) channel, by a frequency converter. In an alternate embodiment, each channel may be modulated directly on the proper RF carrier, without use of an intermediate frequency.

Each of the local and remote terminals contains an RF-Combiner or an RF-Multiplexer (MUX) which combines the individual RF channels. The power level of the combined signal may be adjusted by an amplifier under the control of the local terminal controller for optimum performance. The signal level is dynamically adjusted by the local terminal controller, based on feedback from the remote terminal controller. This amplification step can also be performed for individual channels prior to the combination of the RF channels Each of the local and remote terminals includes an optical modulator such as a Mach Zehnder Interferometer (MZI) which impresses the combined signal an optical carrier generated by a laser.

The laser transmission terminal may use any laser generator usable for communication purposes. It may or may not be tunable. If the laser is tunable, the desired optical carrier wavelength may be controlled (through temperature control or other method) by the local terminal controller.

Filters may be used in the laser terminal to assure proper wavelength, eliminate unwanted portions of the waveform, or to perform other tasks. The modulated optical signal is then amplified, using an optical amplifier (such as an erbium doped fiber amplifier (EDFA), or other device).

The amplified optical signal with the impressed RF signal is then transmitted, to the receiver of the remote terminal. The laser beam is directed, based on information about the remote terminal, i.e. the location and orientation provided by the on-board navigation system and the terminal controller, and the location of the remote receiver (airborne, terrestrial or satellite). A control algorithm, using information provided by the remote receiver, is employed by the local terminal controller to adjust and fine-tune the pointing and tracking of the optical beam.

The free space optical transmission terminal may include adaptive optics, or other devices, to mitigate distortions encountered in the free-space channel. These distortion mitigation devices may or may not utilize information provided by the remote receiver.

The free space optical signal is received by the optical receiver of the remote communication terminal and is amplified, using a low-noise optical amplifier (such as an EDFA or other device). The amplified received optical signal is applied to a photo-detector, such as a PIN Diode, which extracts the aggregate RF signal carried-by the optical signal. The aggregate RF signal is then amplified and processed substantially in reverse of the transmission process.

The optical receiver may include adaptive optics, or other devices, to mitigate distortions encountered in the free-space channel. These distortion mitigation devices may or may not utilize information provided by the remote transmitter. The pointing and tracking of the receive optical terminal may rely on the pointing and tracking of the transmit optical terminal, or may be performed independently.

The aggregate RF signal is demultiplexed, to separate the individual RF subcarrier channels, and downconverted to the proper intermediate frequency (IF). The individual IF signals are amplified, using a low-noise amplifier, to improve link performance. An automatic gain control (AGC) device may be employed to adjust the power level of each IF signal.

Each individual IF signal, including one command and control channel, is demodulated. (In an alternative embodiment, the RF subcarriers may be demodulated directly, without the intermediate frequency).

The separated command and control channel data is provided to the receiving terminal controller. Each of the independent data channels is processed by a Digital Signal Processor (DSP) (or similar device and sent to the designated memory or processor for use.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1A:
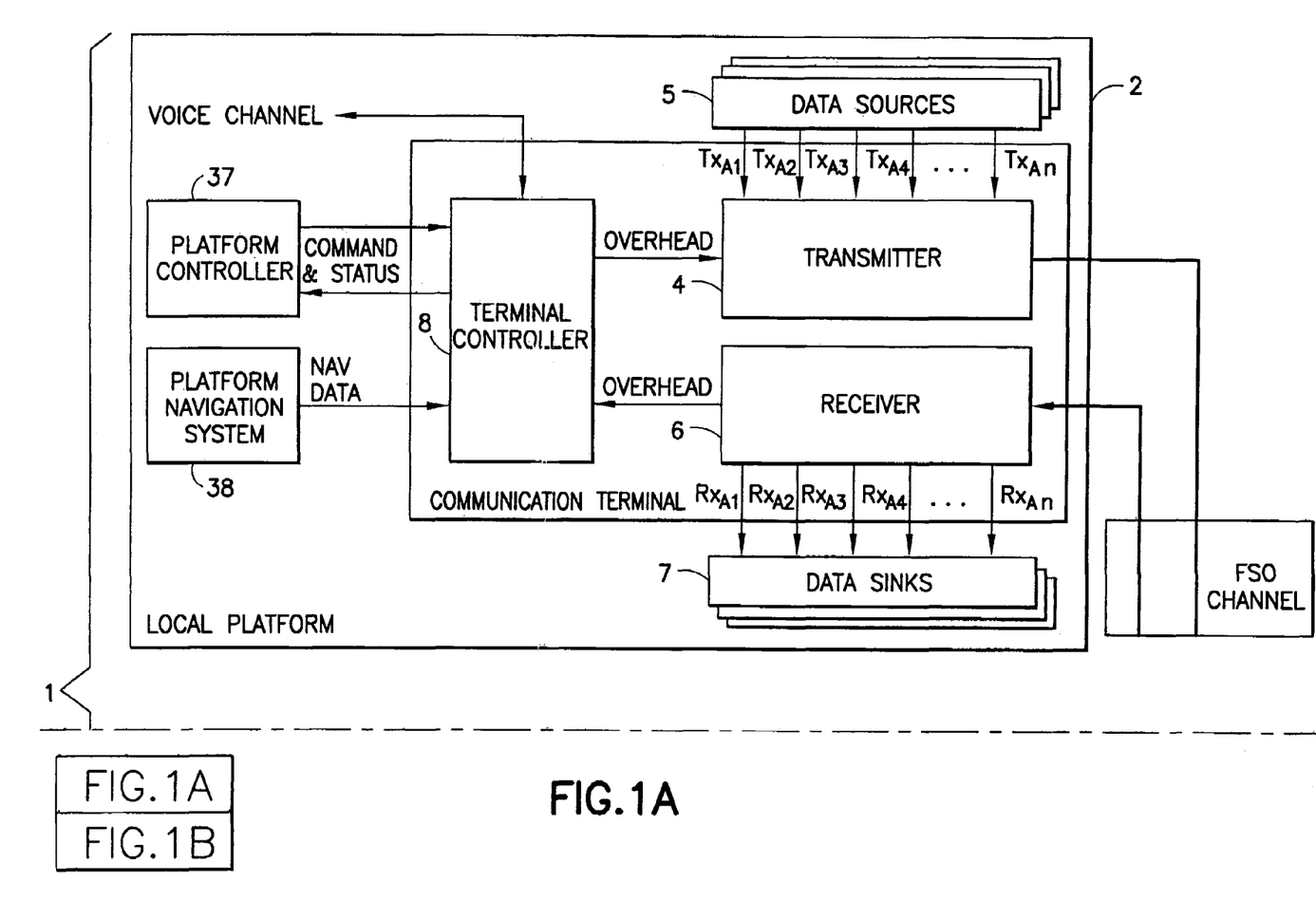
FIG. 1 is a block diagram of the communication system of this application.
Figure 1B:
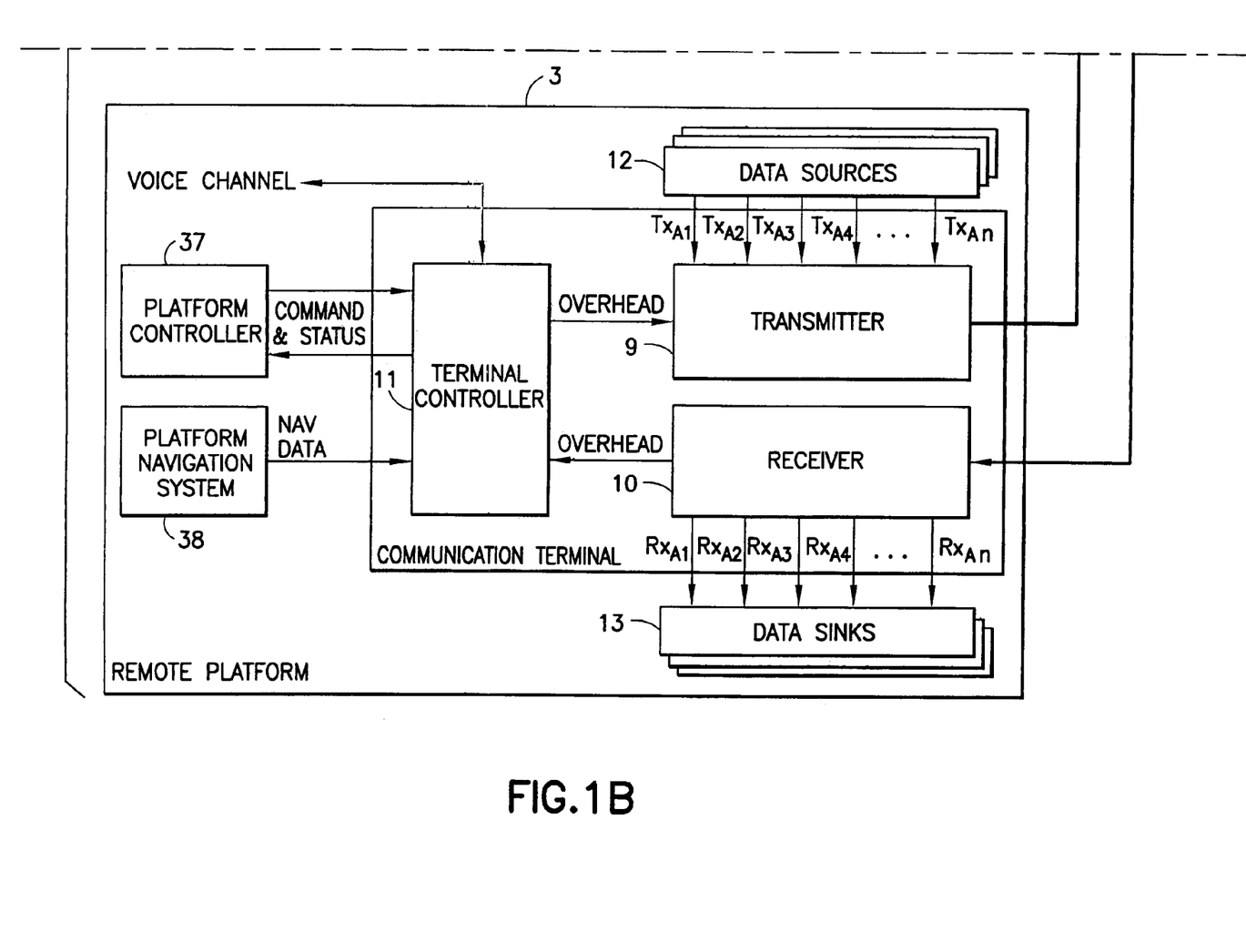

A communication system 1 is shown in FIG. 1 and consists of communication terminals 2 and 3 which are located remote from one another. The terminals 2 and 3 are placed on platforms that are generally moving with respect to each other, for example, an aircraft and ground station, satellite, or other aircraft (not shown) Terminal 2 consists of a transmitter module 4 that includes means to receive and process data from data sources 5. In addition terminal 2 is constructed having receiver 6 that includes means to receive, process and deliver data to data memory 7. Terminal controller 8 contains the necessary computer functions to maintain and operate the terminal 2. Terminal 3 is identical to terminal 2 and includes transmitter 9, receiver 10, and terminal controller 11 for performing the same functions at communication terminal 3. Data sources 12 and data memory 13 provide and retain data for transmission or after reception.

Figure 2:
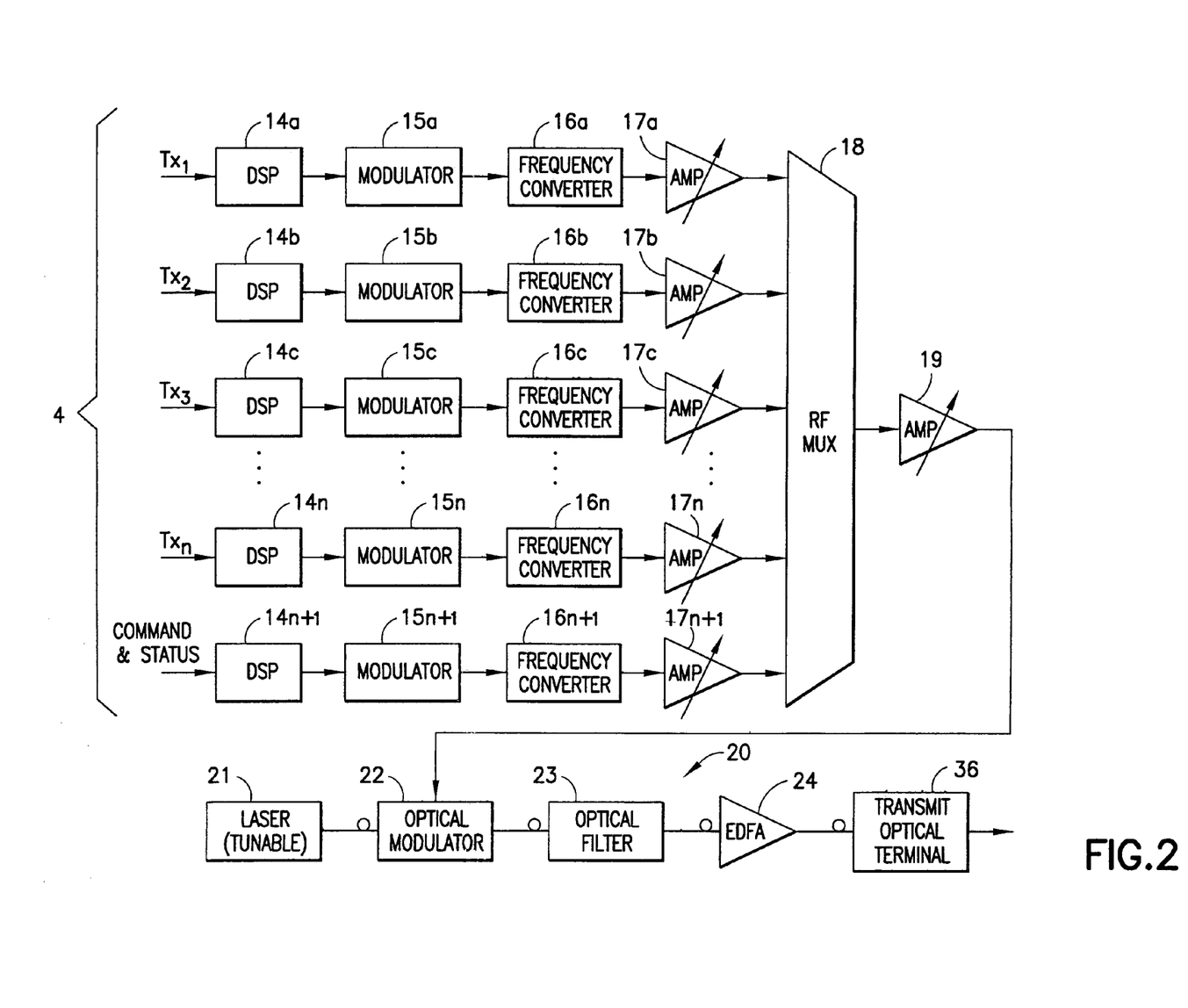
FIG. 2 is a block diagram of a transmitter of the communication system of this application.

The transmitter modules 4 and 9 are shown in FIG. 2 and are constructed to receive multiple channels of data from different data sources and process the data channels for transmission on an optical carrier. Since the transmitter modules 4 and 9 are identical only transmitter module 4 is described below.

The Transmitter module 4, as shown in FIG. 2, is made up of the following key subsystems: a set of n+1 digital signal processor (DSP) blocks $14_{a-n+1}$, n+1 modulators $15_{a-n}$, n+1 frequency converters (upconverters) $16_{a-n+1}$, n+1 RF amplifiers (AMPs) $17_{a-n+1}$ (variable), an RF signal combiner or multiplexer (RF MUX) 18, a broadband RF amplifier (AMP) (variable) 19.

The output of the amplifier 19 is provided to optical transmission module 20. Optical transmission module 20 is comprised of a laser (tunable) 21, an optical modulator 22, an optional optical filter (tunable) 23, an optical amplifier 24, such as an Erbium Doped Fiber Amplifier (EDFA), and a transmit optical terminal 36.

Each DSP block 14 accepts and processes a data stream, provided by either a data source (transmit data streams) or the Terminal Controller (overhead data stream) and performs data scrambling, data interleaving, and data encryption, and forwards error correction coding and other functions. The DSP blocks 14 can be realized separately, or in a single device, for example: a custom DSP chip, a general DSP chip, a custom FPGA, or a custom ASIC. DSP block 14 provides the processed data stream to the modulators 15.

Each modulator 15 accepts the processed data stream from the corresponding DSP block 14 and modulates the signal onto an intermediate frequency (IF) carrier. The modulation process includes: Data modulation using M-ary PSK, M-ary QAM, M-ary FSK, or any other digital modulation technique; Spectrum control, such as square-root raised cosine pulse shaping; and if necessary, distortion mitigation such as linearization. Each modulator 15 produces an analog signal, modulated onto an IF carrier, which is then provided to the corresponding frequency converter 16.

Each frequency converter 16 upconverts the IF signal, provided by the corresponding modulator 15, to a unique RF frequency. As an alternative, the modulator 15 can perform direct modulation to modulate the data stream directly onto the RF carrier. In such a design, frequency converters 16 are unnecessary. In addition, if the IF frequency is also one of the desired IF frequencies, the frequency converters 16 can be eliminated.

The output of each frequency converter 16 (or modulator 15, when the frequency converter 16 is unnecessary) is provided to a variable amplifier (AMP) 17. The AMP 17 is controlled by the terminal controller 8 to optimize channel performance by adjusting the signal level, relative to the other IF signals. The frequency selection for each of the RF signals is an arbitrary selection, based on system requirements. The frequencies should be selected to allow sufficient guardbands between the channels. (Selection of these frequencies can easily be performed by anybody familiar with the art of RF communication system design.) The amplifiers 17 may precede the frequency converters 16, operating on the individual IF signals, rather than the individual RF signals. The amplified RF signals are then supplied to the RF signal combiner or multiplexer 18 (RF MUX).

Multiplexer 18 combines all of the RF signals into an aggregate RF signal, providing isolation between the different channels. The output of the multiplexer 18 is amplified by a variable, broadband RF Amplifier 19 (AMP). The amplifier 19 is also controlled by the terminal controller 8 to optimize system performance by adjusting the drive level into the optical modulator 22.

The optical transmission terminal 20 consists of laser 21 which produces the desired optical carrier. If necessary, the laser 21 can be tunable, allowing the optical carrier wavelength to be selected to meet system requirements. Tunability may be accomplished by temperature control, or other methods. The laser 21 may be a DFB laser or similar device, operating in the 1550 nm window. Other wavelengths may be used to meet specific system requirements.

The optical modulator 22 impresses the aggregate RF signal onto the optical carrier. The optical modulator 22 performs amplitude or intensity modulation of the optical carrier, provided by the laser 21, as a function of the aggregate RF signal. The result is a double-sideband SCM signal. The optical modulator 22 may be realized by a Mach Zehnder Interferometer (MZI) or similar device. The bandwidth of the optical modulator 22 must be sufficient to accept and transmit the aggregate RF signal from the multiplexer 18.

Optical filter 23 is optional and may be used for optical spectrum control. Possible uses of the optical filter 23 include assurance that the signal is in the proper band (this is of particular value if the transmitted channel is one of N channels in a Dense Wavelength Division Multiplexed (DWDM) system).

Optical amplifier 24, such as an Erbium Doped Fiber Amplifier (EDFA), amplifies the optical signal prior to transmission. The EDFA 24 may include an automatic gain control (AGC) circuit and may be variable. In the preferred embodiment, a true Erbium Doped Fiber Amplifier is employed. However, other optical amplifiers, such as Solid State Optical Amplifiers (SOAs), hybrids, or other devices may be substituted, depending on system requirements.

The transmit optical terminal 36 transmits the optical signal to the receiving optical terminal, such as with remotely located communication terminal 3. Transmit optical terminal 36 provides pointing and tracking of the optical signal, and optical channel distortion mitigation, if necessary. In the preferred embodiment, transmit optical terminal 36 is a Steered Agile Beam (STAB) aperture. However, optical turrets or similar devices may be substituted. Transmit optical terminal 36 may include adaptive optics (or equivalent optical circuits) for optical channel distortion mitigation.

Figure 3:
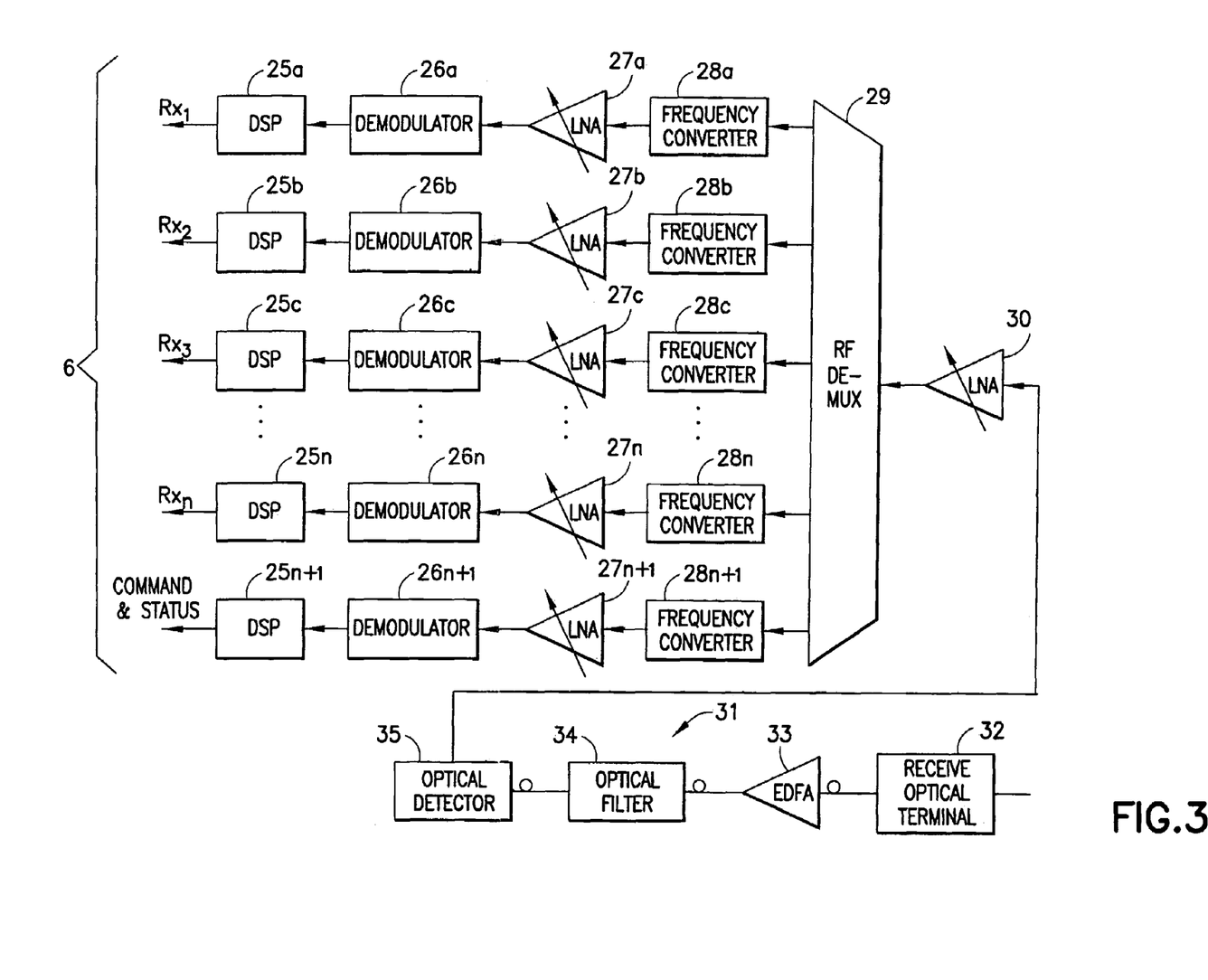
FIG. 3 is a block diagram of a receiver of the communication system of this application.

Receiver module 6 of communication terminal 2 is shown in FIG. 3 and is comprised of a set of n+1 DSP blocks $25_{a-n+1}$, n+1 demodulators $26_{a-n+1}$, n+1 frequency converters (downconverters) $27_{a-n+1}$, n+1 Low Noise Amplifiers (LNAs) $28_{a-n+1}$, an RF demultiplexer (RF DEMUX) 29, a broadband RF low-noise amplifier (LNA) (variable) 30. The RF DEMUX 29 receives signals from an optical receive module 31 which is comprised of a receive optical terminal 32, optical amplifier (EDFA) 33, an optional optical filter (tunable) 34, and optical detector 35.

The DSP blocks 25 perform the inverse of the functions performed in the transmitter's DSP blocks 14 namely, data descrambling, data deinterleaving, data decryption, forward error correction decoding, etc. Each demodulator 26 demodulates the recovered IF signals, created by the corresponding modulator 15.

RF low noise amplifiers (LNAs) 27 receive the converted signals from frequency converters 28 to amplify the individual IF signals prior to demodulation. LNAs 27 are used to overcome losses through the RF demultiplexer 29 (RF DEMUX). Depending on the system requirements and design, LNAs 27 may be replaced by amplifiers with higher noise figures, or omitted entirely. each frequency converter translates the recovered RF signal to the proper IF prior to demodulation. RF demultiplexer 29 separates the individual RF signals from the aggregate signal received from optical receive module 31, providing isolation between the channels.

In order to provide variable gain for the aggregate received waveform, low noise amplifier 30 amplifies the incoming signal from the optical receive module 31 to minimize the noise introduced into the signals, for improved performance. Optical detector 35 is used to extract the aggregate RF signal from the laser carrier signal. In the preferred embodiment optical detector 35 is a PIN Diode with a bandwidth sufficient to recover the aggregate RF signal. An Avalanche Photo Diode (APD) or other device may be substituted. Optical filter 34 is used to limit the optical noise that reaches optical detector for improved optical sensitivity and for spectrum control or other functions.

Optical amplifer 33, in the optical receive module 31 amplifies the received optical signal prior to detection. A low noise EDFA is preferred for improved system performance. The EDFA may include an automatic gain control.

Receive optical terminal 32 performs the acquisition and tracking of the received signal. In the preferred embodiment, the transmit and receive optical terminals 20 and 31 respectively of communication terminal 2 are realized in a common device and pointing, tracking and acquisition are performed simultaneously for both.

Figure 4A:
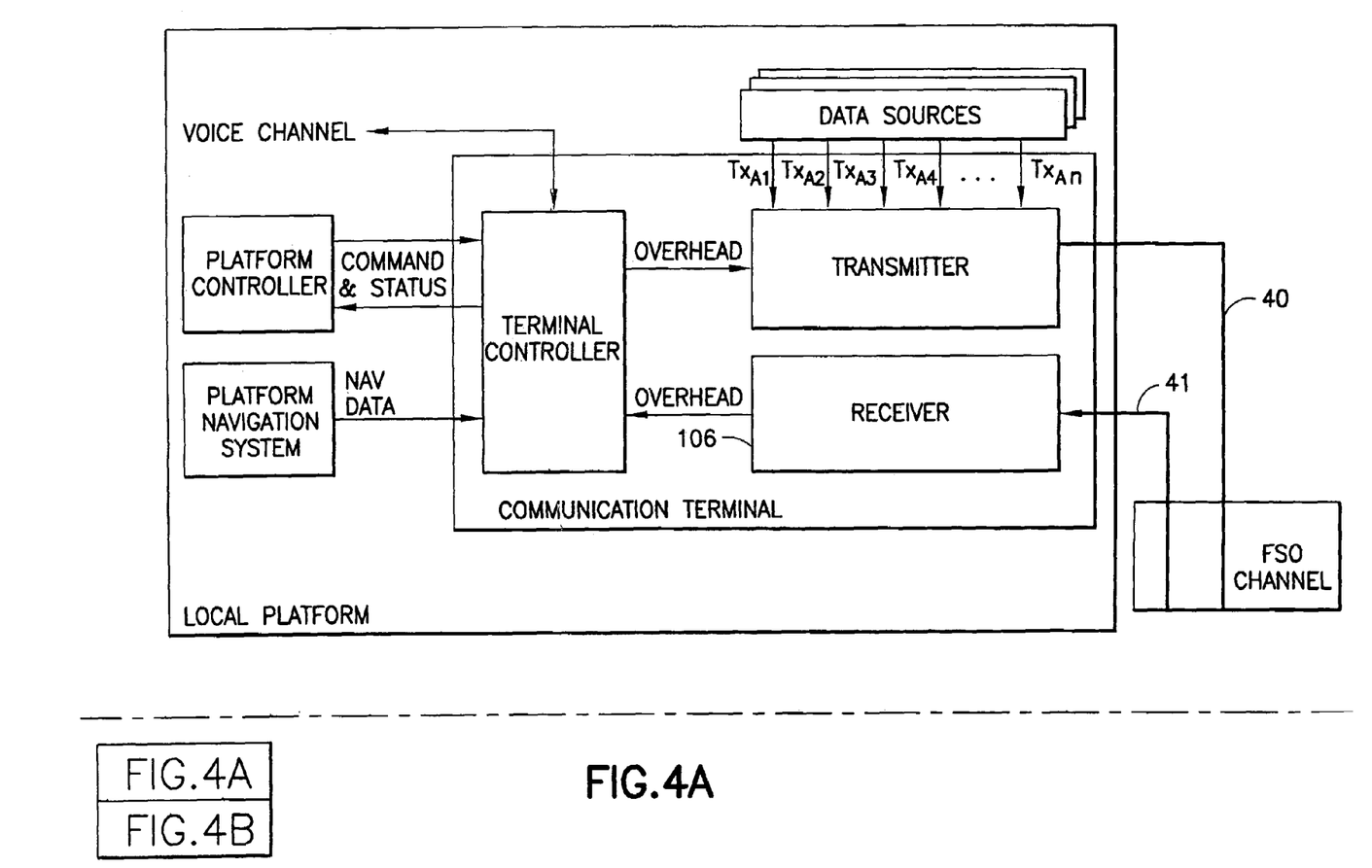
FIG. 4 is a block diagram an alternate embodiment, in which SCM is only used to carry information from the local platform to the remote platform.
Figure 4B:
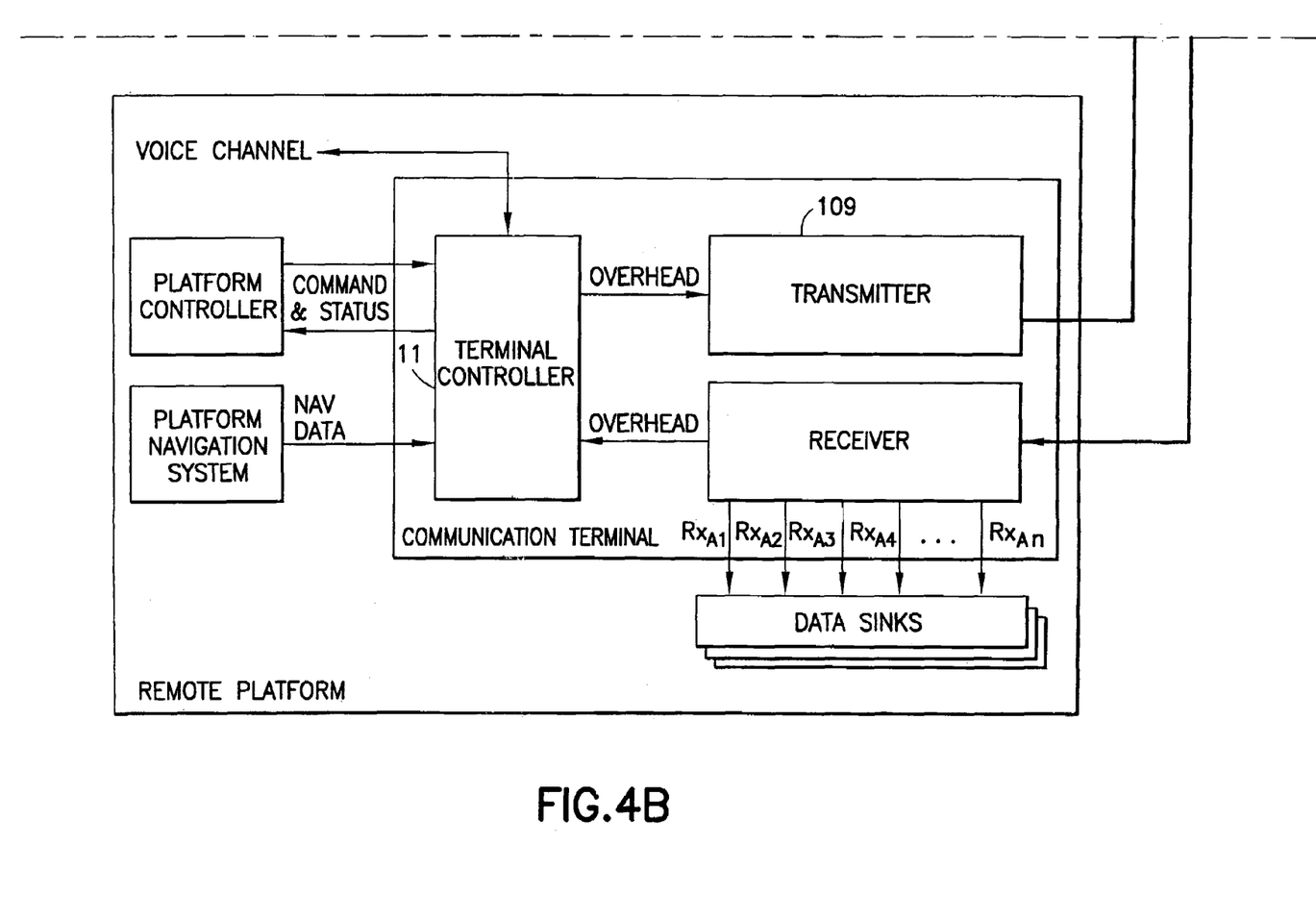

In the alternate embodiment shown in FIG. 4, the communication link can be asymmetric, with a high capacity data link 40 in one direction, and a low-capacity command & status link 41 in the other. In such a case, transmitter 109 and the corresponding receiver 106 can be replaced by systems that meet the reduced requirements of the command & status (only) link 41.

Figure 5:
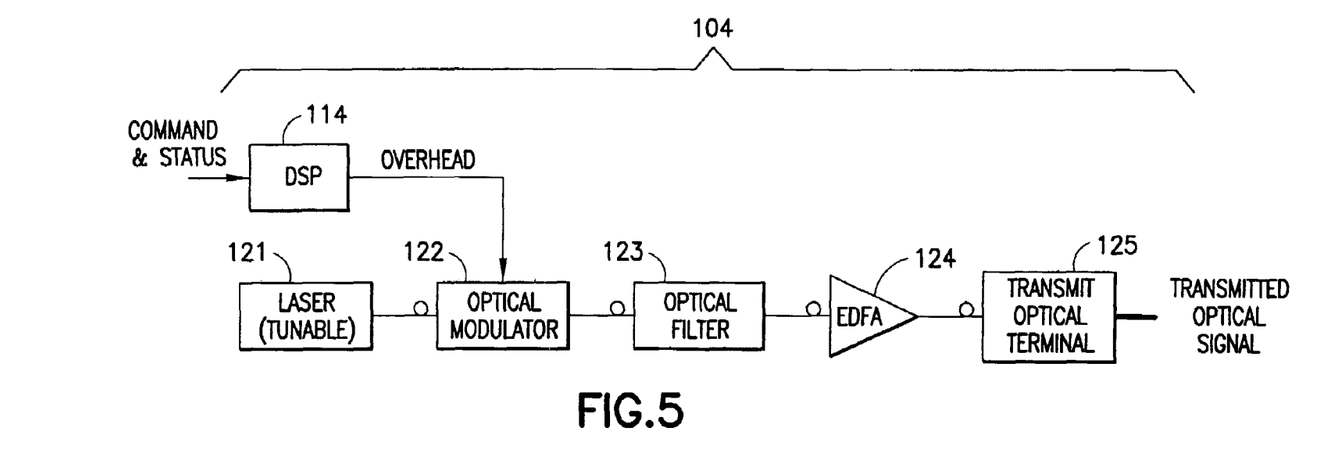
FIG. 5 is a block diagram of the transmitter in the alternate embodiment of FIG. 4.

As shown in FIG. 5, transmitter 109 of the alternate embodiment consists of DSP block 114, which accepts the Command & Status signal for transmission, a laser 121 (tunable), an OOK optical modulator 122, optional optical filter 123, an EDFA 124, and a transmit optical terminal 125.

The OOK optical modulator 122 modulates the digital Overhead signal, produced by the DSP block 114, directly onto the optical carrier using On/Off Keyed modulation. The remaining subsystems are identical to those in the original design, however, the optical filter 123, if employed, may have different characteristics.

Figure 6:
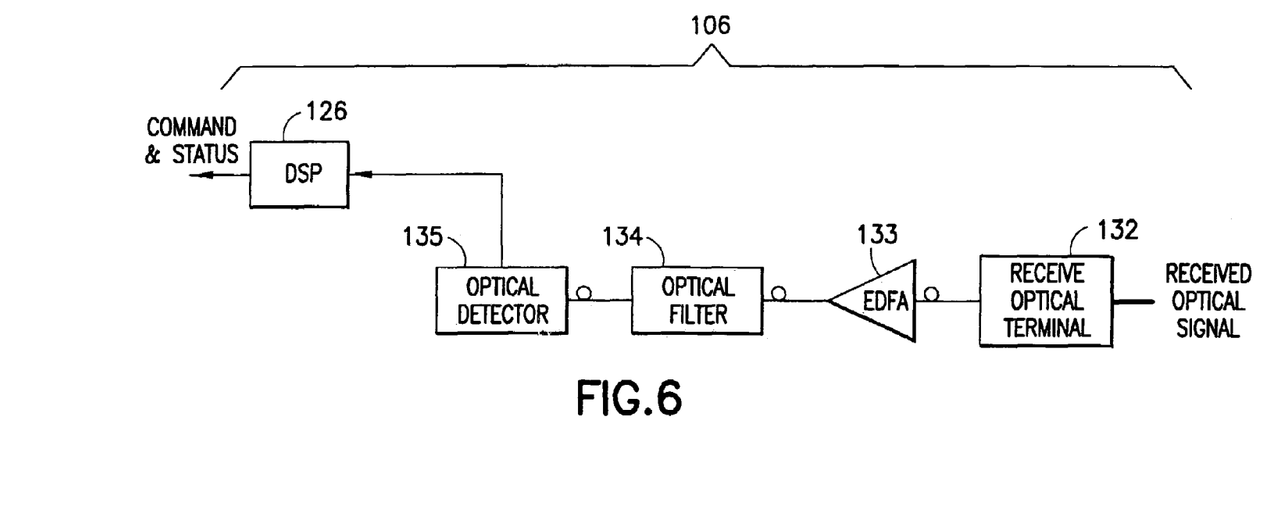
FIG. 6 is a block diagram of the receiver in the alternate embodiment of FIG. 4.

Receiver 106 of the alternate embodiment consists of a DSP block 126, an optical detector 135, an optical filter 134, an EDFA 133, and a receive optical terminal 132. The optical filter 134 is chosen according to the signal rate and format, to improve system performance. The optical detector 135 can have a much narrower bandwidth than that of the original receiver, according to the data rate and format.

The signal transmitted from the remote platform includes only the Command & Control and voice channels. As such, the signal can be a traditional (lower rate) on/off keyed optical signal, and the local and remote Communication Terminals, can be simplified. The overhead channel may be formatted as a standard SONET OC-3 signal (at 155 Mbps), and standard OC-3 transceivers, which include the laser 121, the OOK optical modulator 122, the optical detector 135 and optical filter 134, are employed.

In operation free space laser communication system 1 is made up of communications terminals 2 and 3. For ease of discussion, terminals 2 will be referred to as the local transmitting terminal and terminal 3 will be referred to as the remote receiving terminal.

The local Communication Terminal accepts n independent transmit data streams (designated $Tx_1$, through $Tx_n$, in FIG. 2) from one or more data sources 5. The number of transmit data streams, n, can be as few as 1, and can be arbitrarily large, depending on the rate of each data stream and allowable modulation bandwidth.

The transmit data streams can be supplied by any number of possible sources, including sensors, mass storage units, or data multiplexers (which combine multiple data streams from one or more sources). Each transmit data stream can be formatted differently, according to the system requirements. The format of the transmit data streams will not effect the communication terminal operation or design, other than the interface(s) to the data source(s). Possible formats include SONET, Ethernet, Common Data Link (CDL), and others. Custom formats are also allowed.

In addition to the transmit data streams, the local Communication Terminal 2 will accept an optional clear-voice channel, in standard or custom format, a Command & Status (C&S) signal from platform controller 37, and navigation (NAV) data from the platform navigation system 38. (Note, for fixed platforms, such as ground terminals, the navigation data can simply be position data and may be provided by the platform controller or other source, such as a GPS receiver.)

The local communication terminal 2 provides k independent receive data streams (designated $R_{x1}$ through $R_{xn}$ in FIG. 3) to one or more data sinks 13. The number of receive data streams, k, can be as few as 1, and can be arbitrarily large, depending on the rate of each data stream and allowable modulation bandwidth. The number of transmit data streams, n, and the number of receive data streams, k, may or may not be equal.

The receive data streams can be provided any number of possible data sinks, including sensor data processors, mass storage units, or data demultiplexers. Each receive data stream can be formatted differently, according to the system requirements. The format of the receive data streams will not effect the communication terminal operation or design, other than the interface(s) to the data source(s). Possible formats include SONET, Ethernet, Common Data Link (CDL), and others. Custom formats are also allowed. The transmit data stream(s) and receive data stream(s) may or may not be of the same format(s).

In addition to the receive data streams, the local communication terminal 2 will produce an optional clear-voice channel, in standard or custom format, and a command & status (C&S) signal to the platform controller 37.

The remote receiving terminal 3 will accept and provide an equivalent set of signals, including k transmit data streams, receive data streams, a clear voice channels, a navigation data signal, and the command and status signals.

For example, in one realization, local communication terminal 2 accepts n=16 transmit data streams, each provided by an independent CDL MUX in the standard CDL format at a rate of 274 Mbps. Local communication terminal 2 provides k=4 receive data streams, each provided to an independent CDL MUX in the standard CDL format. Three of the receive data streams operate at a rate of 40 Mbps. The fourth receive data stream operates at a rate of 274 Mbps.

Remote communication terminal 3 would accept k=4 transmit data streams (corresponding to the local terminal's receive data streams) and provide n=16 receive data streams (corresponding to the local terminal's transmit data streams). Both terminals would accept the navigation data signals, and accept/provide the command and status signals.

Figure 7:
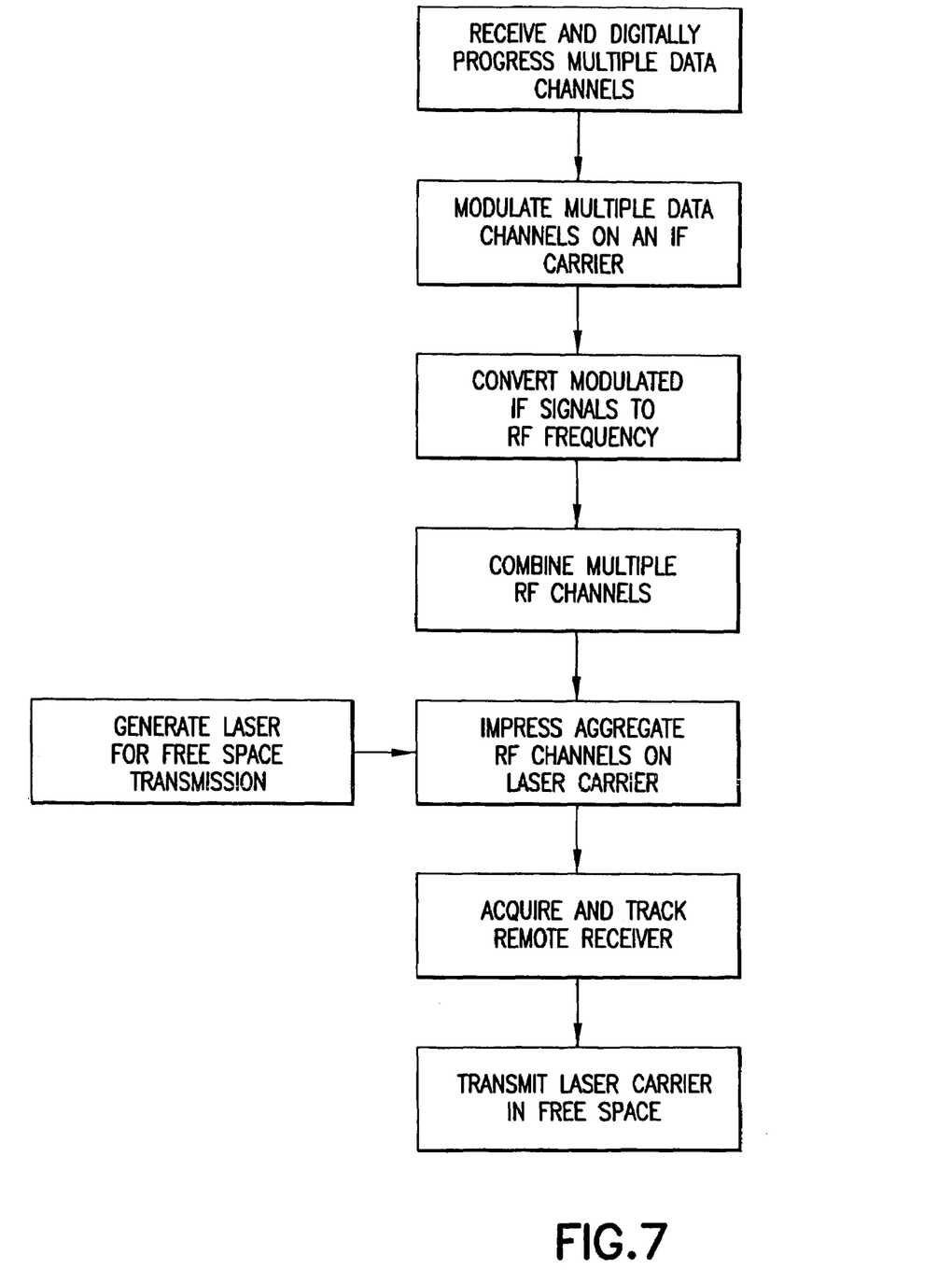
FIG. 7 is a block diagram showing the steps of the transmission sequence of this application.

The basic steps in the transmission sequence of the preferred embodiment is shown in FIG. 7. The system is designed to receive multiple data channels from a data source and from platform components 37 and 38. The data channels are processed in digital signal processors and modulated on an IF carrier. The modulated signals are converted to a unique RF frequency and combined into an aggregate signal. The aggregate signal is impressed on a laser carrier, which is generated for free space transmission.

Free space laser communication systems have smaller beam divergence, which requires accurate pointing of the laser beam. It is therefore important that local transmitting communication terminal 2 acquires and tracks the remote receiving communication terminal 3 and visa versa. This may be accomplished based on data generated or received by each terminal. After accurate tracking is acquired, the laser carrier is transmitted in free space.

Figure 8:
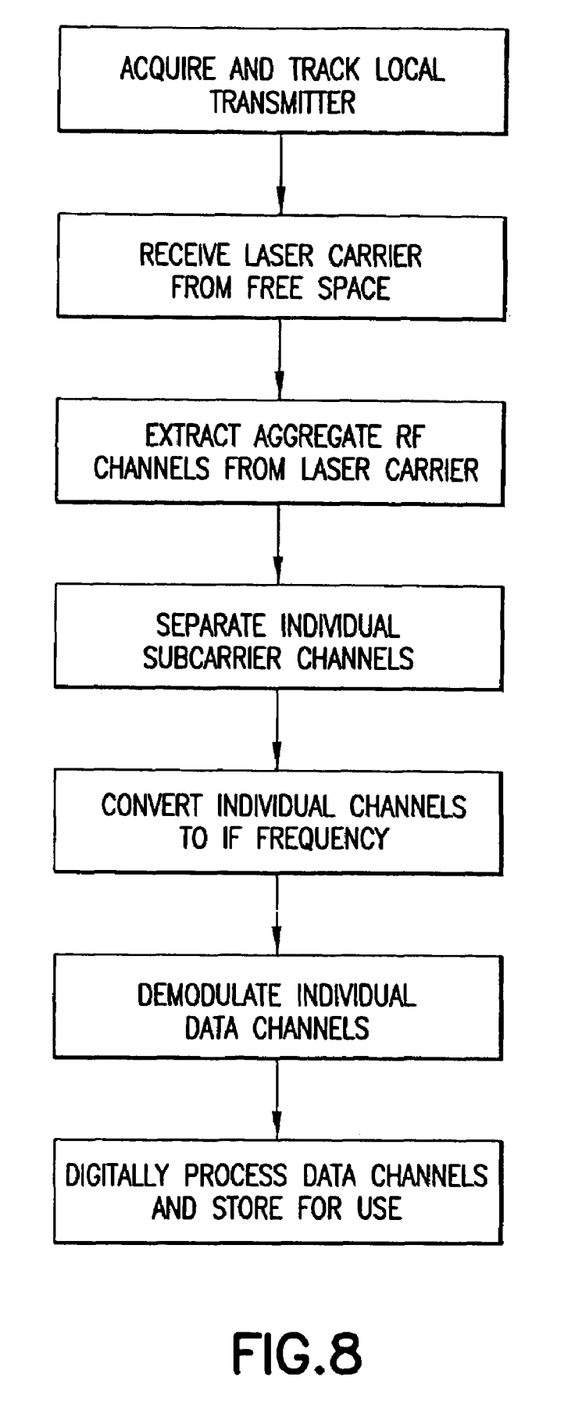
FIG. 8 is a block diagram showing the steps of the reception sequence of this application.

The receiving sequence of remote communication terminal 3 is shown in FIG. 8. As stated before the receiving terminal must accurately acquire and track the local transmitting terminal 2 in order to receive the laser carrier in free space. The laser carrier is detected and the aggregate RF signals are extracted. The individual subcarrier channels are separated by demultiplexing and converted to IF frequency. The individual data channels, including the navigation, command and status, and voice, are demodulated and processed. The data may be then stored for use.

While the invention has been described with reference to specific embodiments, the description of the specific embodiments is illustrative only and is not to be construed as limiting the scope of the invention. Various other modifications and changes may occur to those skilled in the art without departing from the spirit and scope of the invention as defined by the claims.

The invention claimed is:

1. Apparatus for communicating data in free space comprising:
   first and second communication terminals, each of said communication terminals further comprising:
      an RF transmission module for receiving multiple data channels from a data source and processing said data channels to combine said data channels into an aggregate radio frequency subcarrier signal;
      an optical transmission module for receiving said aggregate radio frequency subcarrier signal, impressing said subcarrier signal onto a laser optical carrier signal, and transmitting said laser carrier signal in free space;

an optical reception module for receiving a laser carrier signal from free space and extracting an aggregate radio frequency subcarrier signal therefrom;

an RF reception module for receiving said aggregate radio frequency subcarrier signal and separating said data channels therefrom; and wherein said optical transmission and reception modules have means to acquire and track a remote communication terminal; and a terminal controller connected to said RF transmission module and said RF reception module to control the processing of signals through said modules.

2. Apparatus for communicating data in free space, as described in claim 1, wherein said RF transmission module further comprises:

a digital signal processor for receiving and processing multiple data channels from a data source;

a modulator for receiving said processed data channels and modulating said data channels on an intermediate frequency subcarrier signal; and a multiplexer for combining said individual channels into said aggregate RF subcarrier signal.

3. Apparatus for communicating data in free space, as described in claim 2, further comprising a frequency converter for receiving said modulated channels and converting said modulated intermediate frequency signal to a unique radio frequency signal.

4. Apparatus for communicating data in free space, as described in claim 2, further comprising an amplifier for amplifying said RF subcarrier signal before combination.

5. Apparatus for communicating data in free space, as described in claim 2, further comprising an amplifier for amplifying said aggregate RF subcarrier signal.

6. Apparatus for communicating data in free space, as described in claim 2, further comprising an optical filter for receiving the modulated laser carrier signal and controlling the optical spectrum thereof.

7. Apparatus for communicating data in free space, as described in claim 1, wherein said optical transmission module further comprises:

a laser generator for providing a laser carrier signal;

an optical modulator for receiving the aggregate RF subcarrier signal and impressing said signal on the laser carrier signal;

an optical amplifier for amplifying the laser carrier signal;

an optical transmitter for transmitting the laser carrier signal in free space.

8. Apparatus for communicating data in free space, as described in claim 7, wherein said optical amplifier is an erbium doped fiber amplifier.

9. Apparatus for communicating data in free space, as described in claim 7, wherein said optical amplifier is an erbium doped fiber amplifier.

10. Apparatus for communicating data in free space, as described in claim 1, wherein said optical reception module comprises:

an optical receiving terminal for receiving the laser carrier signal from free space;

an optical amplifier for amplifying said received laser carrier signal; and an optical detector for extracting the aggregate RF subcarrier signal from the laser carrier signal.

11. Apparatus for communicating data in free space, as described in claim 10, further comprising an optical filter for limiting the optical noise of the laser carrier signal received by said optical detector.

12. Apparatus for communicating data in free space, as described in claim 1, wherein said RF reception module comprises:

an RF demultiplexer for decombining the aggregate RF subcarrier signal received from the optical reception module;

a demodulator for extracting individual data channels from said decombined subcarrier signal; and a digital signal processor for processing said individual data channels for storage and use.

13. Apparatus for communicating data in free space, as described in claim 1, wherein said terminal controller provides additional data channels containing status and command information.

14. Apparatus for communicating data in free space, as described in claim 1, wherein said terminal controller provides additional data channels containing navigation information.

15. Apparatus for communicating data in free space, as described in claim 1, wherein:

said RF transmitter module of said first communication terminal and said RF reception terminal of said second communication terminal are constructed to form a high capacity data link for transmitting and receiving multiple data channels including data from a data source and command and status data from a terminal controller; and said RF transmitter module of said second communication terminal and said RF reception terminal of said first communication terminal are constructed to form a low capacity data link for transmitting and receiving command and status data from a terminal controller.

16. In a communication system of a local communication terminal and a remote communication terminal, a method for communicating data in free space comprising the steps of:

receiving multiple individual channels of data from a data source at said local communication terminal;

digitally processing said individual data channels for RF transmission;

modulating said individual data channels on an intermediate frequency subcarrier signal;

combining said individual data channels into an aggregate RF subcarrier signal;

generating a communication laser carrier signal;

impressing said aggregate RF subcarrier signal on said laser carrier signal;

acquiring and tracking a remote communication terminal from said local communication terminal;

transmitting said laser carrier signal in free space from said local communication terminal to said remote communication terminal;

acquiring and tracking said local communication terminal from said remote communication terminal;

receiving said laser carrier signal from free space from said local communication terminal;

extracting said aggregate RF subcarrier signal from said laser carrier signal;

decombining said aggregate RF subcarrier signal into a subcarrier signal containing said individual data signals;

demodulating said intermediate subcarrier signal to obtain said individual data channels; and digitally processing said individual data channels for storage and use, and controlling the processing of the transmitted and received RF signal through a terminal controller connected to an RF transmission module and an RF reception module at each of said local and remote communication terminal.

17. In a communication system of a local communication terminal and a remote communication terminal, a method for communicating data in free space, according to claim 16, further comprising the step of converting said modulated subcarrier signal to a unique RF subcarrier signal.

18. In a communication system of a local communication terminal and a remote communication terminal, a method for communicating data in free space, according to claim 17, further comprising the step of amplifying said converted RF subcarrier signal.

19. In a communication system of a local communication terminal and a remote communication terminal, a method for communicating data in free space, according to claim 16, further comprising the step of amplifying said aggregate RF subcarrier signal.

20. In a communication system of a local communication terminal and a remote communication terminal, a method for communicating data in free space, according to claim 16, further comprising the step of amplifying said received laser carrier signal.

21. In a communication system of a local communication terminal and a remote communication terminal, a method for communicating data in free space, according to claim 16, further comprising the step of filtering said received laser carrier signal.

22. In a communication system of a local communication terminal and a remote communication terminal, a method for communicating data in free space, according to claim 16, further comprising the step of amplifying said extracted aggregate RF subcarrier signal.

23. In a communication system of a local communication terminal and a remote communication terminal, a method for communicating data in free space, according to claim 16, further comprising the step of amplifying said decombined RF subcarrier signal.

24. In a communication system of a local communication terminal and a remote communication terminal, a method for communicating data in free space, according to claim 16, wherein said multiple data channels from a data source are combined with at least one command and status channel for processing and transmission.

25. In a communication system of a local communication terminal and a remote communication terminal, a method for communicating data in free space, according to claim 24, further comprising the steps of:

forming a high capacity data link between a transmitter at said local communication terminal and a receiver at said remote communication terminal for transmitting and receiving said multiple data channels and said at least one command and status channel; and forming a low capacity data link between said transmitter at said remote communication terminal and a receiver at said local communication terminal for transmitting and receiving said at least one command and status channel.

* * * * *